United States Patent [19]

Tanaka et al.

[11] Patent Number: 5,262,513
[45] Date of Patent: Nov. 16, 1993

[54] COPOLYESTER, AND HOLLOW CONTAINER AND STRETCHED FILM MADE THEREOF

[75] Inventors: Katsuji Tanaka; Hitoshi Matsumoto, both of Machida; Takuji Hirahara, Kawasaki; Osamu Kishiro, Atsugi, all of Japan

[73] Assignee: Mitsubishi Kasei Corporation, Tokyo, Japan

[21] Appl. No.: 912,181

[22] Filed: Jul. 13, 1992

[30] Foreign Application Priority Data

Jul. 15, 1991 [JP] Japan ................... 3-174132
Dec. 9, 1991 [JP] Japan ................... 3-324865
Dec. 9, 1991 [JP] Japan ................... 3-324866
Dec. 19, 1991 [JP] Japan ................... 3-337306

[51] Int. Cl.$^5$ ............................. C08G 63/20
[52] U.S. Cl. ...................... 528/272; 528/283; 528/284; 528/302; 528/305; 528/308.6; 428/34.1; 428/364; 428/480
[58] Field of Search ............... 528/272, 283, 284, 302, 528/308, 308.6; 428/34.1, 364, 480

[56] References Cited

U.S. PATENT DOCUMENTS 4,499,262  2/1985  Fagerburg et al. .................. 528/279

FOREIGN PATENT DOCUMENTS 0041035  12/1981  European Pat. Off. .
0465040   1/1992  European Pat. Off. .
WO91-07529 5/1991 PCT Int'l Appl. .

OTHER PUBLICATIONS

Database WPIL, AN-91-219717, JP-A-3 142 224, Jun. 18, 1991.

Primary Examiner—Samuel A. Acquah
Attorney, Agent, or Firm—Oblon, Spivak, McClelland, Maier & Neustadt

[57] ABSTRACT

A copolyester which comprises, as main components, terephthalic acid as a dicarboxylic acid component and ethylene glycol as a diol component and which is characterized by:

(1) isophthalic acid as a dicarboxylic acid component being from 0.5 to 3.0 mol %,
(2) diethylene glycol as a diol component being from 1.0 to 2.5 mol %,
(3) the intrinsic viscosity being from 0.60 to 1.50 dl/g,
(4) the concentration of terminal carboxyl groups being at most 18 eq/ton, and
(5) the content of a cyclic trimer being at most 0.40% by weight.

13 Claims, No Drawings

COPOLYESTER, AND HOLLOW CONTAINER AND STRETCHED FILM MADE THEREOF

BACKGROUND OF THE INVENTION

1. Field of the Invention

The present invention relates to a copolyester useful for bottles, films or sheets. More particularly, the present invention relates to a copolyester which is capable of presenting a molded product with good productivity in its molding and having excellent heat resistance and mechanical properties and which shows excellent productivity in its production, and molded products made thereof.

2. Discussion of Background

Polyethylene terephthalate (hereinafter referred to simply as "PET") is excellent in the mechanical strength, chemical stability, transparency and sanitation and is light in weight and inexpensive. Therefore, it is widely used as packaging material in the form of various sheets and containers. Its use as containers for soft drinks, fruit juices, liquid seasonings, edible oils, liquors and wines has been particularly remarkable in recent years.

For example, in a case of a bottle, such PET is molded into a preform for a hollow molded product by an injection molding machine, and this preform is then subjected to stretch blow molding in a mold having a predetermined shape. In a case where the content of the bottle requires hot filling as in the case of a fruit juice beverage, it is common to conduct heat setting in the blow mold or in a separate mold to form a heat set bottle.

However, conventional PET chips used for molding usually contain oligomers in an amount of from 1 to 2% by weight in the case of melt polymerization chips and from 0.5 to 1.0% by weight even in the case of solid-state polymerization chips, as the amount of a cyclic trimer as the main component of the oligomers. Such oligomers tend to deposit on and contaminate the apparatus such as the mold during the molding operation. Contamination of the mold, etc. is likely to cause blushing or surface roughening of the resulting molded product. Therefore, it is necessary to frequently clean the mold, etc.

Heretofore, it has been attempted to reduce oligomers by prolonging the solid-state polymerization time or by increasing the amount of the catalyst. However, reduction of oligomers by such a method is rather limited and is not economical.

On the other hand, many copolyesters having properties similar to PET, such as a copolyester using terephthalic acid and isophthalic acid as the dicarboxylic acid components and a copolyester using ethylene glycol and diethylene glycol as the diol components, are also known. However, no copolyester has been specifically known with the oligomer content being reduced to a certain extent and having physical properties equal or superior to PET. Further, it has not been known that by copolymerizing a small amount of isophthalic acid to PET, the oligomer content of the copolyester obtainable by melt polymerization, followed by solid-state polymerization, can be lowered as compared with homopolymerized PET.

SUMMARY OF THE INVENTION

It is an object of the present invention to provide a copolyester which has a low oligomer content and produces no substantial oligomers during the molding operation and thus scarcely contaminates the mold, etc. during the molding operation and which has heat resistance at least equal to conventional PET and has a high polymerization rate and an oligomer-reducing rate during solid-phase polymerization, and thus presents high productivity.

The present inventors have conducted extensive studies to accomplish the above object and as a result, have found a copolyester with certain specific physical property ranges having small amounts of isophthalic acid units and diethylene glycol units incorporated to conventional PET. The present invention has been accomplished on the basis of this discovery.

That is, the present invention provides the following copolyester and molded products made thereof.

A copolyester which comprises, as main components, terephthalic acid as a dicarboxylic acid component and ethylene glycol as a diol component and which is characterized by:

(1) isophthalic acid as a dicarboxylic acid component being from 0.5 to 3.0 mol %, (2) diethylene glycol as a diol component being from 1.0 to 2.5 mol %, (3) the intrinsic viscosity being from 0.60 to 1.50 dl/g, (4) the concentration of terminal carboxyl groups being at most 18 eq/ton, and (5) the content of a cyclic trimer being at most 0.40% by weight.

The above copolyester is preferably produced by solid-state polymerization of the following prepolymer.

A prepolymer which comprises, as main components, terephthalic acid as a dicarboxylic acid component and ethylene glycol as a diol component and which is characterized by (1) isophthalic acid as a dicarboxylic acid component being from 0.5 to 3.0 mol %, (2) diethylene glycol as a diol component being from 1.0 to 2.5 mol %, (6) the intrinsic viscosity being from 0.50 to 0.70 dl/g, and (7) the concentration of terminal carboxyl groups being from 15 to 30 eq/ton.

DETAILED DESCRIPTION OF THE PREFERRED EMBODIMENTS

Now, the present invention will be described in detail with reference to the preferred embodiments.

With respect to terephthalic acid and ethylene glycol as the main components for the copolyester of the present invention, conventional materials commonly used for PET, may be employed.

Materials for isophthalic acid units include isophthalic acid, esters such as dimethyl isophthalate and diethyl isophthalate, isophthalic acids having the nuclei substituted by alkyl, alkoxy, aryl, aralkyl, halogen, etc., such as 5-t-butylisophthalic acid and 5-methylisophthalic acid, 5-sulfonylisophthalic acid and its sodium salt. Among them, isophthalic acid or dimethyl isophthalate is particularly preferred.

On the other hand, diethylene glycol (hereinafter referred to simply as "DEG") is produced as a by-product from ethylene glycol during the polymerization reaction. Therefore, the content of the DEG component can be controlled simply by properly selecting the reaction conditions, additives, etc., other than a case where DEG or its ester-forming derivative is used in a prescribed amount as the polymerization material. Especially in the case of the copolyester of the present invention, the melt polymerization temperature can be lowered by the effects obtained by the addition of isophthalic acid (hereinafter referred to simply as "IPA"), whereby the amount of DEG to be formed as a by-product, can be easily controlled to a low level. Further, formation of DEG can be controlled by adding a small amount of an additive, for example, a tertiary amine such as triethylamine, tri-n-butylamine or benzyldimethylamine, a quaternary ammonium hydroxide such as tetraethylammonium hydroxide, tetrabutylammonium hydroxide or trimethylbenzylammonium hydroxide, or a basic compound such as lithium carbonate, sodium carbonate, potassium carbonate or sodium acetate. On the other hand, formation of DEG can be promoted and the DEG content can be increased by adding a small amount of an inorganic acid such as sulfuric acid to the polymerization material. Such an additive to control the amount of formation of DEG is used usually within a range of from 0.001 to 10% by weight, preferably from 0.005 to 1% by weight, based on the entire polymerization material, as the case requires.

The copolyester of the present invention has a feature that the proportion of IPA in the total dicarboxylic acid component is from 0.5 to 3.0 mol %, preferably from 1.0 to 2.5 mol %, and the proportion of DEG in the total diol component is from 1.0 to 2.5 mol %, preferably from 1.2 to 2.3 mol %. If the respective proportions are less than the above ranges, the oligomer-reducing rate in the solid-state polymerization step for the production of the copolyester of the present invention, is low, and the effects to reduce the oligomer deposited on the mold during the molding operation tend to be inadequate, and no superiority over conventional PET tends to be observed. On the other hand, if the proportions exceed the above ranges, the heat resistance of a molded product tends to be poor, and when a stretched molded product is subjected to heat setting, improvement in the heat resistance due to the heat setting effects tends to be little, such being undesirable. Especially when the amount of IPA exceeds 10 mol %, the decrease in the glass transition temperature of the copolyester itself tends to be substantial, the heat resistance tends to be substantially low, and formation of oligomers derived from IPA tends to be remarkable, such being undesirable.

The intrinsic viscosity of the copolyester of the present invention is usually within a range of from 0.60 to 1.50 dl/g, preferably from 0.65 to 1.20 dl/g, more preferably from 0.70 to 1.00 dl/g, as measured at 30° C. in a solvent mixture of phenol/tetrachloroethane (1/1 by weight ratio). If the intrinsic viscosity is less than 0.60 dl/g, a molded product obtained from such a copolyester will have no adequate practical strength. On the other hand, if the intrinsic viscosity exceeds 1.50 dl/g, the melt viscosity tends to be too high, and the shear heat generation during injection or extrusion molding or in a molding machine, tends to be substantial, whereby oligomers which have once been reduced, will again be produced in a substantial amount, and consequently, no improvement for the prevention of contamination of the mold, etc. will be obtained, such being undesirable.

The content of oligomers in the copolyester of the present invention is usually at most 0.40% by weight, preferably at most 0.35% by weight, more preferably at most 0.32% by weight, most preferably at most 0.30% by weight, in terms of the content of a cyclic trimer as the main component of the oligomers. When the copolyester with a cyclic trimer content of at most 0.40% by weight is subjected to molding, an improvement in the prevention of contamination of the mold, etc. will be observed. In general, the smaller the content of the cyclic trimer, the better the improvement in the prevention of contamination of the mold, etc. For example, even when the content of the cyclic trimer exceeds 0.35% by weight, a substantial improvement in the prevention of contamination can be observed, although the improvement may not be sufficient if the content exceeds 0.40% by weight, and if the content of the cyclic trimer exceeds 0.50% by weight, contamination tends to be remarkable. Therefore, with respect to the improvement for the prevention of contamination of the mold, etc., the content of the cyclic trimer being at most 0.40% by weight or not, will be an index.

The degree of contamination of the mold is closely related to the content of the cyclic trimer in the molded product. Namely, if the content of the cyclic trimer in the molded product is not more than 0.40% by weight, a substantially sufficient improvement for the prevention of contamination of the mold, can be obtained, and if it is at most 0.35% by weight, the improvement for the prevention of contamination of the mold is remarkable. At a level of 0.45% by weight, a substantial improvement for the prevention of contamination can be obtained although the improvement may not be adequate. At a level of 0.55% by weight or higher, contamination will be remarkable. With respect to the improvement for the prevention of contamination of the mold, the content of the cyclic trimer in the molded product being at most 0.45% by weight or not, will be another index.

The density of the copolyester of the present invention, is usually at least 1.37 $g/cm^3$, preferably at least 1.38 $g/cm^3$, more preferably at least 1.39 $g/cm^3$, as measured at 25° C. by means of a density gradient tube employing a solvent mixture of carbon tetrachloride/n-heptane. If the density is less than 1.37 $g/cm^3$, the non-crystalline fraction in the copolyester tends to be high, whereby the solid-state polymerization or heat treatment tends to be inadequate, and oligomers can not adequately be reduced.

With the copolyester of the present invention, the concentration of terminal carboxyl groups (hereinafter referred to simply as "AV") is usually at most 18 eq/ton, preferably at most 16 eq/ton, more preferably at most 14 eq/ton. A copolyester having the oligomer content efficiently reduced during the solid-state polymerization, has AV within this range, when AV is within this range, the effects to reduce oligomers deposited to the mold, etc. during the molding of the copolyester of the present invention, will be substantial, and the moisture resistance, thermal stability, etc., will also be improved. If AV exceeds the above range, the effects to reduce oligomers deposited on the mold, etc. during the molding, tend to be low, and the moisture resistance, thermal stability, etc., will also be low, such being undesirable. In the preparation of the copolyester of the present invention, a copolyester subjected to solid-state polymerization will be referred to as a "prepolymer". AV of the copolyester of the present invention can be controlled by the moisture-controlling conditions, the crystallization conditions and the solid-state polymerization conditions for the prepolymer and AV of the prepolymer. For example, AV can be controlled by changing the temperature, time or pressure of each of steps for the moisture control, crystallization and solid-state polymerization of the prepolymer. As other specific examples, AV of the copolyester of the present invention can be lowered, for example, by lowering AV of the prepolymer, by suppressing hydrolysis during the crystallization step or the solid-state polymerization step by reducing the amount of water impregnated during the moisture control of the prepolymer, or by increasing the ethylene glycol concentration in the inert gas stream used for the solid-state polymerization. On the other hand, AV of the copolyester of the present invention can be increased, for example, by increasing AV of the prepolymer, by increasing the amount of water impregnated during the moisture control of the prepolymer, by accelerating the hydrolysis during the crystallization step or the solid-state polymerization step e.g. by conducting the crystallization while introducing steam, or by reducing the ethylene glycol concentration in the inert gas stream used for the solid-state polymerization.

In the copolyester of the present invention, the proportion of the terminal carboxyl groups to the total terminal groups (hereinafter referred to simply as AV/TEV) is preferably within a range of from 7 to 25 equivalent %, more preferably from 8 to 20 equivalent %, most preferably from 10 to 18 equivalent %. When AV/TEV is within the above range, the solid-state polymerization rate or the oligomer-reducing rate is high during the production, whereby the productivity will be improved, and the amount of the oligomers to be produced as byproducts during the molding can thereby be further reduced. This AV/TEV ratio can be controlled in the same manner as for the above described AV.

In the production of PET by solid-state polymerization, it is common to set the solid-state polymerization conditions so that the solid-state polymerization rate (the degree of increase of the intrinsic viscosity per unit time) is as high as possible to attain the desired intrinsic viscosity in a short period of time in order to increase the productivity. It has been well known that a close relation exists between the solid-state polymerization rate and AV and AV/TEV relating to PET. In general, if AV is the same, the solid-state polymerization rate becomes highest when AV/TEV is within a range of from 30 to 35 equivalent %. The optimum AV to bring the solid-state polymerization rate to the highest level, may automatically be determined by the intrinsic viscosity and the optimum value of AV/TEV.

Accordingly, in general, it is preferred to conduct solid-state polymerization under such a condition that AV and AV/TEV would be the optimum values to bring the solid-phase polymerization rate to the highest level. Therefore, AV is usually at a level of from 20 to 35 eq/ton, and AV/TEV is usually at a level within a range of from 25 to 40 equivalent %.

Whereas, with respect to the oligomer-reducing rate in solid-state polymerization, it has been found as a result of an extensive study by the present inventors that the lower the AV and the lower the AV/TEV, in other words, the higher the concentration of terminal hydroxyl groups, the higher the oligomer-reducing rate. Accordingly, when the copolyester of the present invention is prepared by solid-state polymerization, it is advisable that AV and AV/TEV of the prepolymer to be used, are as low as possible with a view to reducing the oligomers. However, as mentioned above, with respect to the solid-state polymerization rate, there exists the optimum values for AV and AV/TEV. Therefore, it is necessary to set AV and AV/TEV so that both the solid-state polymerization rate and the oligomer-reducing rate will be high. Due to the effects obtained by the copolymerization of a small amount of IPA, the solid-state polymerization rate is basically high as compared with homopolymerization of PET. Therefore, unless AV and AV/TEV are set at extremely low levels, even if AV and AV/TEV are set at low levels to slow down the solid-state polymerization rate to some extent, the solid-state polymerization rate would be substantially the same level as in the case of usual homopolymerization of PET. The copolyester of the present invention obtained by solid-state polymerization already has the desired intrinsic viscosity, and therefore it is unnecessary to subject it solid-state polymerization again. Therefore, AV and AV/TEV may be very low, which is advantageous, since the resistance against hydrolysis is thereby improved.

When the copolyester of the present invention contains germanium atoms, the content of germanium atoms is usually preferably from 30 to 60 ppm by weight, more preferably from 35 to 55 ppm by weight, most preferably from 40 to 50 ppm by weight. On the other hand, when antimony atoms are contained, the content thereof is usually preferably from 150 to 300 ppm by weight, more preferably from 170 to 280 ppm by weight, most preferably from 200 to 250 ppm by weight. When compared with homopolymer of PET, the copolyester of the present invention is superior in the productivity since the solid-state polymerization rate is high and the solid-state polymerization time required for reducing the oligomer content to the same level in the production, may be short when the same amount of germanium atoms or antimony atoms is contained. Besides, the amount of oligomers produced as byproducts during the molding operation is small, and the effects to improve the prevention of contamination of the mold are improved. However, the larger the content of germanium atoms or antimony atoms, the higher the oligomer-reducing rate, the higher the solid-state polymerization rate and the more the improvement in the productivity in the production of the copolyester of the present invention. However, the amount of oligomers produced as byproducts during the molding operation, tends to increase. To the contrary, the smaller the content of the germanium atoms or antimony atoms, the smaller the amount of oligomers produced as byproducts during the molding operation, but the productivity tends to decrease during the production of the copolyester of the present invention. When the contents of germanium atoms and antimony atoms are within the above ranges, both the productivity during the production of the copolyester of the present invention and the reduction of the amount of oligomers produced as byproducts during the molding operation, will be substantially improved, such being desirable. Such germanium atoms or antimony atoms, are the ones derived from a germanium compound or an antimony compound used as a polymerization catalyst for the copolyester of the present invention, which will be described hereinafter, and which is taken into the polymer.

With respect to the thermal properties of the copolyester of the present invention, the glass transition temperature (Tg) is desired to be usually within a range of from 72° to 82° C., preferably from 74° to 82° C., more preferably from 75° to 82° C., and the low temperature crystallization peak (Tc) is desired to be usually within the range of from 130° to 210° C., preferably from 150° to 205° C., more preferably from 160° to 200° C. For the determination of such Tg and Tc, 5 mg of a sample of the copolyester is heated from room temperature to 285° C. at a rate of 20° C./min by a differential scanning calorimeter (hereinafter referred to simply as "DSC") and then melted and maintained at 285° C. for 3 minutes. Then, the sample is quickly taken out and immediately immersed into liquid nitrogen, maintained therein for one minute and then left to stand at room temperature for 30 minutes to one hour. The sample returned to room temperature, is returned to the temperature and again heated from room temperature at a rate of 20° C./min, whereupon Tg and Tc are determined from the specific heat modification behavior due to the glass transition and from the heat generation behavior due to crystallization, from the calorie curve thereby measured. More specifically, Tg is the temperature at the intersection of the tangent line at an intermediate point of the specific heat modification due to glass transition with the tangent line at a point prior to the specific heat modification, and Tc is the temperature at which the heat generation per unit time becomes the maximum at the heat generation peak due to crystallization. When Tg and Tc are within the above ranges, it is readily possible to obtain a proper level of crystallinity as normal molding material and to bring the heat resistance of a molded product obtainable by heat setting after stretching to a level of at least equal to homopolymerized PET.

With respect to the thermal properties of a molded product obtained by injection molding or extrusion molding of the copolyester of the present invention, it is desired that Tg is usually within a range of from 72 to 82° C., preferably from 74° to 82° C., more preferably from 75° to 82° C., and Tc is usually within a range of from 130° to 180° C., preferably from 130° to 170° C., more preferably from 135° to 165° C., as measured in the same manner as described above using DSC. When Tg and Tc are within these ranges, the molded product has a proper crystallinity as a ordinary molded product, and it is easy to bring the heat resistance of a molded product obtained by heat setting after stretching to a level of at least equal to homogenized PET. With respect to the copolyester and its molded product, there is a tendency that Tc is lower with the molded product. This phenomenon is considered to indicate that the shear history during the molding remains in the molded product and does not completely disappear by the melting operation at a level of 3 minutes at 285° C. by DSC.

The content of acetaldehyde in the copolyester of the present invention is desired to be usually at most 7 ppm by weight, preferably at most 5 ppm by weight, more preferably at most 3 ppm by weight. When the acetaldehyde content is within such a range, there will be no bad odor or abnormal smell derived from acetaldehyde, or there will be no change in the taste or flavor of the content, when the copolyester of the present invention is formed into a molded product such as a bottle or a container for food.

The above-described copolyester of the present invention can be prepared by melt polymerization, followed by solid-state polymerization in accordance with a conventional method known with respect to PET.

Now, a process for its preparation will be described in detail. As a melt polymerization method, there is a method wherein an esterification reaction is conducted directly under pressure using terephthalic acid, isophthalic acid and ethylene glycol and then the temperature is raised and at the same time the pressure is gradually reduced to conduct a polycondensation reaction. Otherwise, an ester exchange reaction may be conducted using ester derivatives of terephthalic acid such as dimethyl terephthalate and dimethyl isophthalate, and ethylene glycol, and then the obtained reaction product is further subjected to polycondensation. In these melt polymerization reactions, the isophthalic acid component may be added at any optional time i.e. during the esterification reaction or the ester exchange reaction, or at the initial stage of the polycondensation reaction. For example, an ester derivative of terephthalic acid and ethylene glycol may first be subjected to an ester exchange reaction, and then isophthalic acid is added to the ester exchange reaction product, followed by polycondensation. Such a polycondensation reaction may be conducted in one step or in a divided fashion in a plurality of steps. When the reaction is conducted in a plurality of steps, the polycondensation reaction conditions may be such that the reaction temperature for the first step of polycondensation is usually from 250° to 290° C., preferably from 260° to 280° C., and the pressure is usually from 500 to 20 mmHg, preferably from 200 to 30 mmHg, and the temperature of the final step of the polycondensation reaction is usually from 265° to 300° C., preferably from 270° to 295° C., and the pressure is usually from 10 to 0.1 mmHg, preferably from 5 to 0.5 mmHg.

When the polycondensation reaction is conducted in two steps, the polycondensation reaction conditions for the first and second steps are in the above ranges, respectively. When the reaction is conducted in three or more steps, the intermediate steps are conducted under the reaction conditions between the above-mentioned ranges.

For example, when the polycondensation reaction is conducted in three steps, the reaction temperature for the polycondensation reaction of the second step is usually from 260° to 295° C., preferably from 270° to 285° C., and the pressure is usually within a range of from 50 to 2 mmHg, preferably from 40 to 5 mmHg.

There is no particular restriction as to the intrinsic viscosity reached by each of these polycondensation reaction steps. However, it is desirable that it is smoothly distributed in view of the degree of increase of the intrinsic viscosity in each step, and the intrinsic viscosity of the prepolymer obtained from the polycondensation reactor of the final stage is usually from 0.45 to 0.80 dl/g, preferably from 0.50 to 0.70 dl/g, more preferably from 0.50 to 0.65 dl/g. If the intrinsic viscosity of the prepolymer is less than the above range, chipping tends to be difficult. On the other hand, if it exceeds the above range, withdrawal of the prepolymer from the reactor tends to be difficult, and the effects to reduce oligomers when the product is subjected to solid-state polymerization tend to be small. Usually, the prepolymer is withdrawn in the form of a strand from a molten state and then cut into chips. Such chips usually preferably have an average particle diameter of from 2.0 to 5 mm, preferably from 2.2 to 4.0 mm.

In the esterification reaction, the ester exchange reaction and the polycondensation reaction as described above, suitable amounts of an esterification catalyst, an ester exchange catalyst, a polycondensation catalyst and a stabilizer are preferably employed.

The esterification catalyst may not necessarily be used, since terephthalic acid and isophthalic acid used serve as self-catalysts for the esterification reaction. However, if necessary, a small amount of an inorganic acid may, for example, be used.

As an ester exchange catalyst, a known compound commonly used for PET, for example, at least one of calcium, titanium, manganese, zinc, sodium and lithium compounds, may be employed. From the viewpoint of transparency, a manganese compound is particularly preferred.

As a polycondensation catalyst, a known compound commonly used for PET, for example, at least one of germanium, antimony, titanium and cobalt compounds may be employed. A germanium or antimony compound is particularly preferred. In a case where transparency of the resulting copolyester is important, it is preferred to employ a germanium compound. As the germanium or antimony compound, oxides, inorganic acid salts, organic salts, halides and sulfides thereof may be mentioned.

In each of the ester exchange catalyst and the polycondensation catalyst, such a catalyst is used usually in an amount within a range of from 5 to 2000 ppm by weight, preferably from 10 to 500 ppm by weight, as the amount of metal in the total polymerization material. Especially when a germanium compound is used, the amount of the compound is usually within a range of from 10 to 100 ppm by weight, preferably from 30 to 60 ppm by weight, more preferably from 35 to 55 ppm by weight, most preferably from 40 to 50 ppm by weight, as the content of germanium atoms in the prepolymer or in the copolyester after the solid-phase polymerization. Further, when an antimony compound is used, the amount is usually within a range of from 150 to 300 ppm by weight, preferably from 170 to 280 ppm by weight, more preferably from 200 to 250 ppm by weight, as the content of antimony atoms in the prepolymer or in the copolyester after the solid-state polymerization. When the content of germanium atoms or antimony atoms is within the above range, the oligomer-reducing rate and the solid state polymerization rate during the production of the copolyester by the solid-state polymerization of the prepolymer and the reduction in the formation of oligomers as byproducts during the molding can be increased, such being advantageous. To satisfy the above ranges, for example, when germanium dioxide is used, from 50 to 300 ppm by weight, based on the polymer, of germanium dioxide is usually employed, and when antimony trioxide is used, from 180 to 1000 ppm by weight, based on the polymer, of antimony trioxide is usually employed at the time of the melt polymerization. However, the contents may separately be controlled, for example, by adjusting the polymerization temperature, pressure or time as well as the ratio of the dicarboxylic acid component to the glycol component of the esterification reactants.

As the stabilizer, an ester of phosphoric acid such as trimethyl phosphate, triethyl phosphate, tri-n-butyl phosphate, trioctyl phosphate, triphenyl phosphate or tricresyl phosphate, an ester of phosphorous acid such as triphenyl phosphite, trisdodecyl phosphite or tris-nonylphenyl phosphite, an ester of acidic phosphoric acid such as methyl acid phosphate, isopropyl acid phosphate, butyl acid phosphate, dibutyl phosphate, monobutyl phosphate or dioctyl phosphate, or a phosphorus compound such as phosphoric acid, phosphorous acid, hypophosphoric acid or polyphosphoric acid, is, for example, preferred. The stabilizer is used usually in an amount within a range of from 10 to 1000 ppm by weight, preferably from 20 to 200 ppm by weight, as the weight of phosphorus atoms in the stabilizer in the total weight of the starting material. Especially when a germanium compound is used as the polycondensation catalyst, it is preferred to use the stabilizer so that phosphorus atoms contained in the prepolymer or in the copolyester after the solid-state polymerization would be usually within a range of from 0.3 to 1.5 times, preferably from 0.4 to 1.0 time, by the weight ratio to germanium atoms contained in combination. When the content of phosphorus atoms is within this range, the thermal stability of the prepolymer or the copolyester obtainable by the solid-state polymerization, will be good, and the oligomer-reducing rate during the production of the copolyester by the solid-state polymerization of the prepolymer, will be increased, such being advantageous.

Further, dicarboxylic acid component other than terephthalic acid and isophthalic acid, and a diol component other than ethylene glycol and diethylene glycol, may be contained in small amounts, so long as the above-mentioned requirements for the present invention are satisfied. Such a dicarboxylic acid component includes phthalic acid, 2,6-naphthalenedicarboxylic acid, 4,4'-diphenylsulfonedicarboxylic acid, 4,4'-biphenyldicarboxylic acid, 1,4-cyclohexanedicarboxylic acid, 1,3-phenylenedioxydiacetic acid and structural isomers thereof, an aliphatic dicarboxylic acid such as malonic acid, succinic acid or adipic acid, and an oxy acid or its derivative, such as p-hydroxybenzoic acid, a p-hydroxybenzoate, and glycolic acid. The diol component includes, for example, an aliphatic glycol such as 1,2-propanediol, 1,3-propanediol, 1,4-butanediol, pentamethylene glycol, hexamethylene glycol or neopentyl glycol, an alicyclic glycol such as cyclohexane dimethanol, and an aromatic dihydroxy compound derivative such as bisphenol A or bisphenol S. The composition (constituting units) of the prepolymer produced by the melt polymerization and the contents of germanium atoms, antimony atoms and phosphorus atoms are substantially the same as in the copolyester obtainable by subjecting the prepolymer to solid-state polymerization. However, more specifically, the contents of such germanium atoms, antimony atoms and phosphorus atoms may sometimes decrease during the solid-state polymerization by an amount of from 0 to 10%, respectively, relative to the contents of the respective atoms in the prepolymer.

It is advisable that AV of the prepolymer is usually within a range of from 10 to 40 eq/ton, preferably from 15 to 30 eq/ton, more preferably from 18 to 25 eq/ton. When AV is within such a range, the solid-state polymerization rate during the solid-state polymerization of the prepolymer is high, and the oligomer-reducing effects are large, such being advantageous. If AV is less than the above range, solid-state polymerizability tends to be poor, whereby it tends to take a long time to increase the intrinsic viscosity to a desired level. On the other hand, if it exceeds the above range, the oligomer-reducing effects tend to be inadequate when the prepolymer is subjected to solid-state polymerization.

Further, it is advisable that AV/TEV of the prepolymer is usually within a range of from 10 to 25 equivalent %, preferably from 12 to 22 equivalent %, more preferably from 14 to 20 equivalent %. If the proportion of terminal carboxyl groups to the total terminal groups is within such a range, the solid-state polymerization rate and the oligomer-reducing rate during the solid-state polymerization of the prepolymer, are high, whereby the productivity will be improved, and the reduction in the formation of oligomers as byproducts during the molding can be furthered, such being advantageous.

The control of AV and AV/TEV of the prepolymer can be conducted by a conventional method for controlling AV and AV/TEV commonly employed in the melt polymerization of PET, for example, by controlling the final esterification ratio in the esterification reaction or the temperature, pressure or time during the ester exchange reaction or the polycondensation reaction. The final esterification ratio in the esterification reaction can be controlled not only by the temperature, pressure or time of the esterification reaction but also by e.g. the feeding ratio of the diol to the dicarboxylic acid or the refluxing ratio (or the distillation rate) of formed water or diol. As a more specific example, a case will be described wherein the prepolymer for a copolyester of the present invention is prepared by using a continuous melt-polymerization installation commonly used for the preparation of PET by direct polycondensation. In such a case, it is possible to increase the final esterification ratio by prolonging the reaction time for the esterification reaction, so that AV and AV/TEV of the prepolymer will be lowered. However, more preferably, the final esterification ratio is increased by adjusting the refluxing ratio of ethylene glycol to a level larger than the case for ordinary PET, or by adjusting the esterification reaction temperature to a higher level, so that AV and AV/TEV of the prepolymer will be lowered. This is preferred from the viewpoint of the productivity of the prepolymer. Further, AV and AV/TEV of the prepolymer immediately prior to being subjected to solid-state polymerization, may be controlled also by properly selecting the moisture-controlling conditions or the crystallization conditions for the prepolymer, as mentioned in the foregoing, other than the control during the melt polymerization of the prepolymer as described above.

Then, in order to obtain a copolyester of the present invention, the prepolymer chips obtained by the melt polymerization as described above, are subjected to solid-state polymerization treatment.

The prepolymer chips to be subjected to solid-state polymerization may be the ones having the moisture content adjusted by treating with water, steam or a steam-containing inert gas atmosphere, or may preliminarily be heated at a temperature lower than the temperature for solid-state polymerization, for preliminary crystallization and then supplied to the solid-state polycondensation step. Such a preliminary crystallization step may be conducted by heating the prepolymer chips in a dried state usually at a temperature of from 120° to 200° C., preferably from 130° to 180° C. for from one minute to 4 hours, or may be conducted by heating the chips in a steam atmosphere or a steam-containing inert gas atmosphere, usually at a temperature of from 120° to 200° C. for at least one minute. Otherwise, such a preliminary crystallization step can be conducted by permitting the prepolymer chips to absorb moisture in an atmosphere of water, steam or a steam-containing inert gas and then heating the moisture-controlled prepolymer chips usually at a temperature of from 120° to 200° C. for at least one minute. The moisture control of the prepolymer is carried out usually to such an extent that the water content of the prepolymer would be usually within a range of from 0.01 to 1% by weight, preferably from 0.1 to 0.5% by weight. By subjecting the water-containing prepolymer chips to a crystallization step or a solid-state polymerization step, it is possible to further reduce the amount of acetaldehyde contained in the copolyester of the present invention.

The solid-state polymerization process to which the above prepolymer chips are supplied, comprises at least one step, and the polymerization temperature is usually from 190° to 230° C., preferably from 195° to 225° C. In a case of an inert gas stream method, the pressure is usually within a range of from 1 kg/cm$^2$G to 10 mmHg, preferably from 0.5 kg/cm$^2$G to 100 mmHg, and the polymerization is conducted in an inert gas stream such as nitrogen, argon or carbon dioxide. In a case of a reduced pressure method, the pressure is usually from 0.01 to 300 mmHg, preferably from 0.01 to 100 mmHg. The solid-state polymerization time is usually from 1 to 50 hours, preferably from 5 to 30 hours, more preferably from 10 to 25 hours, provided that the higher the temperature, the shorter the time to reach the desired physical properties.

Bu properly selecting the conditions for the solid-state polymerization treatment as described above, a copolyester of the present invention can be obtained.

The polyester of the present invention thus obtained may be formed into films, sheets, containers or other packaging materials, by means of a melt molding method which is commonly employed for PET. Further, the mechanical strength can be improved by stretching the copolyester at least in one axial direction.

To produce a stretched film, the stretching temperature may be set at a level between the glass transition temperature of the copolyester of the present invention and a temperature higher by 70° C. than the glass transition temperature. It is usually from 40° to 170° C., preferably from 60° to 160° C. Stretching may be monoaxial or biaxial. However, biaxial stretching is preferred from the viewpoint of the practical physical properties of the film. The stretching ratio is usually within a range of from 1.1 to 10 times, preferably from 1.5 to 8 times, in the case of monoaxial stretching, and within a range of from 1.1 to 8 times, preferably from 1.5 to 5 times in each of the longitudinal direction and the transverse direction. Further, the ratio of the stretching ratio in the longitudinal direction to the stretching ratio in the transverse direction is usually from 0.5 to 2, preferably from 0.7 to 1.3. The stretched film thus obtained, is further subjected to heat setting to improve the heat resistance and mechanical strength. The heat setting is carried out usually under tension at a temperature of from 120° C. to the melting point, preferably from 150° to 230° C., usually for from a few seconds to a few hours, preferably from a few tens seconds to a few minutes.

To produce a hollow molded product, the preform prepared from the copolyester of the present invention, is subjected to stretch blow molding. For this purpose, a conventional apparatus commonly employed for blow molding of PET, can be employed. Specifically, for example, a preform is first molded by injection molding or extrusion molding, and subjected directly, or after processing the mouth portion and the bottom portion and reheating the processed preform, to a biaxially stretching blow molding method such as a hot parison method or a cold parison method. In such a case, the molding temperature, specifically the temperature of various parts of the cylinder and the nozzle of the molding machine, can be set at a temperature usually lower by from 1° to 10° C. than in the case for ordinary PET, usually within a range of from 260° to 280° C., whereby the amount of oligomers can readily be controlled to a low level. Further, lowering of the intrinsic viscosity can be controlled at a low level, and the amount of acetaldehyde produced as a byproduct can readily be controlled at a low level. The stretching temperature is usually from 70° to 120° C., preferably from 80° to 110° C., and the stretching ratio may be usually within a range of from 1.5 to 3.5 times in the longitudinal direction and from 2 to 5 times in the circumferential direction.

A hollow molded product thus obtained, may be used as it is. However, especially for the content which requires hot filling such as a fruit juice beverage or Chinese tea, the hollow molded product is usually subjected to heat setting in the blow mold to impart heat resistance before use. The heat setting is conducted usually under tension by air pressure at a temperature of from 100° to 200° C., preferably from 120° to 180° C., for from a few seconds to a few hours, preferably from a few seconds to a few minutes.

Now, the present invention will be described in further detail with reference to Examples. However, it should be understood that the present invention is by no means restricted to such specific Examples. In the following Examples, "parts" means "parts by weight".

Various measuring methods employed in these Examples are as follows. The measuring methods for the intrinsic viscosity and the density were as described above.

(1) Amount of isophthalic acid (hereinafter referred to simply as "IPA amount")

A sample was subjected to methanol-addition decomposition by a usual method, and the resulting dimethyl ester component was quantitatively analyzed by gas chromatography.

(2) Amount of diethylene glycol (hereinafter referred to simply as "DEG amount")

A sample was subjected to hydrolysis by a usual method, and the resulting diol component was quantitatively analyzed by gas chromatography.

(3) Content of a cyclic trimer (hereinafter referred to simply as "CT amount")

200 mg of a sample was dissolved in 2 ml of a liquid mixture of chloroform/hexafluoroisopropanol (volume ratio: 3/2) and further diluted by an addition of 20 ml of chloroform. To this solution, 10 ml of methanol was added to reprecipitate the sample, followed by filtration to obtain a filtrate. The filtrate was evaporated to dryness, and the residue was dissolved in 25 ml of dimethylformamide. With respect to the solution thus obtained, the content of a cyclic trimer was quantitatively analyzed by liquid chromatography.

(4) Concentration of terminal carboxyl groups (hereinafter referred to simply as "AV")

100 mg of a copolyester sample was dissolved under heating in 5 ml of benzyl alcohol and diluted by an addition of 5 ml of chloroform. Then, the terminal carboxyl group concentration was quantitatively analyzed by titration of a 0.1N sodium hydroxide/benzyl alcohol solution using Phenol Red as an indicator.

(5) Concentration of the total terminal groups (hereinafter referred to simply as "TEV")

Using the following equation, it was calculated from the intrinsic viscosity.

$$TEV = \{2000000/(1359 \times intrinsic\ viscosity)^{1.460}\}$$

(unit: eq/ton)

(6) The ratio of terminal carboxyl groups to the total terminal groups (hereinafter referred to simply as "AV/TEV")

AV was divided by TEV, and the value thereby obtained was multiplied by 100 to show the percentage (unit: equivalent %).

(7) Content of germanium atoms (hereinafter referred to simply as "Ge amount")

2.0 g of a copolyester sample was ashed and completely decomposed by a usual method in the presence of sulfuric acid and then adjusted to a volume of 100 ml with distilled water, whereby the germanium content was quantitatively analyzed by an emission spectral analysis.

(8) Content of antimony atoms (hereinafter referred to simply as "Sb amount")

In the same manner as the analysis of the germanium content, the antimony content was quantitatively analyzed by an emission spectral analysis.

(9) Content of phosphorus atoms (hereinafter referred to simply as "P amount")

In the same manner as the analysis of the germanium content, the phosphorus content was quantitatively analyzed by an emission spectral analysis.

(10) Glass transition temperature (Tg) and low temperature crystallization temperature (Tc)

Measured by the method described in the foregoing using SEIKO I & E, SSC/580 (DSC20) Model Differential Scanning Calorimeter (manufactured by Seiko Denshi Kogyo K.K.).

(11) Content of acetaldehyde (hereinafter referred to simply as "AA amount")

A sample was extracted with water at 160° C. for 2 hours, whereupon the acetaldehyde content was quantitatively analyzed by gas chromatography.

(12) Solid-state polymerization rate

The increasing rate of the intrinsic viscosity per unit hour during the solid-state polymerization, obtained by dividing the difference between the intrinsic viscosity of the product obtained by the solid-state polymerization and the intrinsic viscosity of the prepolymer by the solid-state polymerization time, was taken as the solid-state polymerization rate (unit: dl/g/hr).

(13) Inert gas flow rate

The inert gas flow rate was represented by the volume at 25° C. under 1 atm of the gas passed through the unit weight of resin (kg) per unit time (hr).

EXAMPLE 1

A slurry comprising 12560 parts of terephthalic acid, 394 parts of isophthalic acid and 5820 parts of ethylene glycol, was prepared and gradually supplied over a period of 4 hours to an esterification tank having 300 parts of bis(2-hydroxyethyl)terephthalate previously added and maintained at 250° C. After completion of the supply, the mixture was maintained at 250° C. for one hour for esterification. Then, one half was transferred to a polycondensation tank and 1.14 parts of phosphoric acid (150 ppm by weight to the polymer) and 0.91 part of germanium dioxide (120 ppm by weight to the polymer) were charged. The temperature was gradually raised from 250° C. to 280° C., while the pressure was gradually reduced from an ordinary pressure and maintained at a level of 0.5 mmHg. The reaction was conducted for 3 hours. Then, the formed prepolymer was withdrawn in the form of a strand from the outlet provided at the bottom of the polycondensation tank, cooled by water and then cut into chips. The analytical results of the prepolymer chips thereby obtained are shown in Table 1.

EXAMPLE 2

Prepolymer chips were prepared in the same manner as in Example 1 except that 12700 parts of terephthalic acid and 263 parts of isophthalic acid were used. The analytical results of the prepolymer chips are shown in Table 1.

EXAMPLE 3

Prepolymer chips were prepared in the same manner as in Example 2 except that 197 parts of isophthalic acid and 1.10 parts of germanium dioxide (145 ppm by weight to the polymer) were used. The analytical results of the prepolymer chips are shown in Table 1.

EXAMPLE 4

14850 parts of dimethyl terephthalate, 150 parts of dimethyl isophthalate, 10600 parts of ethylene glycol and 2.60 parts of manganese acetate tetrahydrate (175 ppm to the polymer) were charged to a reactor, and the temperature was gradually raised from 160° C. to 220° C. over a period of 4 hours, and an ester exchange reaction was conducted while distilling off methanol formed by the reaction.

To this reaction product, 2.67 parts of phosphoric acid (180 ppm by weight to the polymer) and 1.78 parts of germanium dioxide (120 ppm by weight to the polymer) were added, and polymerization was conducted for 3 hours at a final temperature of 275° C. under 0.5 mmHg to obtain prepolymer chips. The analytical results of the prepolymer chips are shown in Table 1.

EXAMPLE 5

Prepolymer chips were prepared in the same manner as in Example 2 except that 1.90 parts of phosphoric acid (250 ppm by weight to the polymer) and 2.74 parts of antimony trioxide (360 ppm by weight to the polymer) instead of germanium dioxide were used, and the polymerization time was changed to 2.5 hours. The analytical results of the prepolymer chips are shown in Table 1.

EXAMPLE 6

Prepolymer chips were prepared in the same manner as in Example 5 except that 1.06 parts of phosphoric acid (140 ppm by weight to the polymer) and 2.36 parts of antimony trioxide (310 ppm by weight to the polymer) were used. The analytical results of the prepolymer chips are shown in Table 1.

EXAMPLE 7

Prepolymer chips were prepared in the same manner as in Example 5 except that the esterification reaction time after completion of supplying the starting material slurry was changed to one hour and 30 minutes. The analytical results of the prepolymer chips are shown in Table 1.

EXAMPLE 8

Prepolymer chips were prepared in the same manner as in Example 1 except that the esterification reaction time after completion of supplying the starting material slurry was changed to 40 minutes. The analytical results of the prepolymer chips are shown in Table 1.

EXAMPLE 9

An ester exchange reaction was conducted in the same manner as in Example 4 except that 14800 parts of dimethyl terephthalate, 225 parts of dimethyl isophthalate and 9600 parts of ethylene glycol were used. To this reaction product, 1.26 parts of cobalt acetate tetrahydrate (85 ppm by weight to the polymer) was added, and 1.80 parts of phosphoric acid (120 ppm by weight to the polymer) and 4.30 parts of antimony trioxide (290 ppm by weight to the polymer) instead of germanium dioxide were used. Otherwise, the operation was conducted in the same manner as in Example 4 to obtain prepolymer chips. The analytical results of the prepolymer chips are shown in Table 1.

EXAMPLE 10

Prepolymer chips were prepared in the same manner as in Example 5 except that 130 parts of isophthalic acid, 1.29 parts of phosphoric acid (170 ppm by weight to the polymer) and 2.60 parts of antimony trioxide (345 ppm by weight to the polymer) were used. The analytical results of the prepolymer chips are shown in Table 1.

COMPARATIVE EXAMPLE 1

Prepolymer chips were prepared in the same manner as in Example 2 except that no isophthalic acid was added. The analytical results of the prepolymer chips are shown in Table 1.

COMPARATIVE EXAMPLE 2

Prepolymer chips were prepared in the same manner as in Example 5 except that no isophthalic acid was added. The analytical results of the prepolymer chips are shown in Table 1.

COMPARATIVE EXAMPLE 3

Prepolymer chips were prepared in the same manner as in Example 2 except that 12500 parts of terephthalic acid and 814 parts of isophthalic acid were used. The analytical results of the prepolymer chips are shown in Table 1.

COMPARATIVE EXAMPLE 4

Prepolymer chips were prepared in the same manner as in Example 2 except that 350 parts of diethylene glycol was added to the prepared slurry. The analytical results of the prepolymer chips are shown in Table 1.

COMPARATIVE EXAMPLE 5

Prepolymer chips were prepared in the same manner as in Example 2 except that the esterification reaction time after completion of supplying the starting material slurry was shortened to 30 minutes. The analytical results of the prepolymer chips are shown in Table 1.

COMPARATIVE EXAMPLE 6

Prepolymer chips were prepared in the same manner as in Example 5 except that the esterification reaction time after completion of supplying the starting material slurry was shortened to 30 minutes. The analytical results of the prepolymer chips are shown in Table 1.

COMPARATIVE EXAMPLE 7

Prepolymer chips were prepared in the same manner as in Example 2 except that 0.45 part of germanium dioxide (65 ppm by weight to the polymer) was used. The analytical results of the prepolymer chips are shown in Table 1.

COMPARATIVE EXAMPLE 8

Prepolymer chips were prepared in the same manner as in Example 2 except that 0.674 part of phosphoric acid (90 ppm by weight to the polymer) and 1.37 parts of antimony trioxide (180 ppm by weight to the polymer) instead of germanium dioxide were used. The analytical results of the prepolymer chips are shown in Table 1.

EXAMPLE 11

The surface of the prepolymer chips obtained in Example 1 were crystallized at 150° C. by a stirring-type crystallizing machine (manufactured by Bepex Co.). Then, the prepolymer chips were transferred to a solid-state polymerization tower, dried under a nitrogen stream of 20 l/kg/hr at about 150° C. for 3 hours and then subjected to solid-state polymerization at 208° C. for 20 hours to obtain solid-state polymerization chips. The analytical results of the solid-state polymerization chips are shown in Table 2.

EXAMPLES 12 to 23

Using prepolymer chips obtained in Examples 1 to 10 solid-state polymerization was conducted for 20 hours at 208° C. or 215° C. in the same manner as in Example 11 to obtain solid-state polymerization chips. The analytical results of the solid-state polymerization chips are shown in Table 2.

COMPARATIVE EXAMPLES 9 to 18

Using prepolymer chips obtained in Comparative Examples 1 to 8, solid-state polymerization was conducted for 20 or 30 hours at 208° C. in the same manner as in Example 11 to obtain solid-state polymerization chips. The analytical results of the solid-state polymerization chips are shown in Table 2.

EXAMPLE 24

Using solid-state polymerization chips obtained in Example 11, a preform was molded by an injection molding machine IS-60B Model, manufactured by Toshiba Corporation set for a temperature of various parts of the cylinder and the nozzle head of 270° C., a screw rotational speed of 100 rpm, an injection time of 10 seconds and a mold quenching water temperature of 10° C. This preform was, after heating and crystallizing the mouth portion by a crystallizing machine, blow-molded by a stretch blow molding machine set for a preheating furnace temperature of 90° C., a blow pressure of 20 kg/cm$^2$ and a molding cycle of 10 seconds to form a bottle having a barrel portion wall thickness of 300 μm and having an internal capacity of 1 l, followed by heat setting for 10 seconds under an air-pressure tension in the mold set at 150° C. The analytical results of the heat set bottle are shown in Table 3.

Further, as a continuous molding test, 1000 bottles were continuously molded, whereby no contamination of the mold was observed in each of the injection, blow molding and heat setting operations.

Further, as a hot filling test, an orange fruit juice sterilized at 90° C. and left to cool to 85° C. was filled in the heat set bottle, and sealed with a cap. And the bottle was placed upside down for 15 minutes, whereupon a deformation of the bottle was inspected whereby no leakage of the juice or no deformation of the mouth portion, shoulder portion and the barrel portion was observed.

EXAMPLES 25 to 35

Using solid-state polymerization chips obtained in Examples 13 to 23, heat set bottles were molded in the same manner as in Example 24 except that the temperature of various parts of the cylinder and the nozzle head of the injection molding machine was changed to 265° C. or 275° C. The analytical results of the bottles are shown in Table 3.

Further, continuous molding tests were conducted in the same manner as in Example 24, and the molds after the molding were inspected, whereby no contamination was observed in the mold of each of the injection, blow molding and heat setting operations in each case.

Further, hot filling tests were conducted in the same manner as in Example 24, whereby no leakage or no deformation at the mouth portion, the shoulder portion and the barrel portion was observed in each of the heat set bottles prepared by using the respective solid-state polymerization chips.

COMPARATIVE EXAMPLES 19 to 30

Using solid-state polymerization chips obtained in Comparative Examples 9 to 18, heat set bottles were molded in the same manner as in Example 24 except that the temperature of various parts of the cylinder and the nozzle head of the injection molding machine was changed to 270° C. or 275° C. The analytical results of the bottles are shown in Table 3.

When injection molding was conducted at a temperature of various parts of the cylinder and the nozzle head of 270° C. using solid-state polymerization chips of Comparative Example 10 and 12, the obtained preforms had blushing, and it was impossible to conduct the molding satisfactorily. As the cause, the solid-state polymerization chips had a high melting point since no isophthalic acid component was copolymerized, and they could not completely be melted at the injection molding temperature of 270° C.

Further, continuous molding tests were conducted in the same manner as in Example 24, whereupon the molds after the molding were inspected. In the case where the solid-phase polymerization chips of Comparative Example 13 were employed, no contamination was observed in the mold of each of the injection, blow molding and heat setting operations. In the cases where the solid-state polymerization chips other than those of Comparative Example 13 were used, a white thin film-like deposition was observed in each case, although there was a certain difference in the degree of the deposition. From the visual inspection, it was observed that the larger the content of the cyclic trimer in the molded product, the more remarkable the contamination of the mold.

Further, hot filling tests were conducted in the same manner as in Example 24. With the heat set bottles molded from the solid-state polymerization chips obtained in Comparative Examples 13 and 14, the shoulder portions and the barrel portions underwent substantial deformations, and leakage of the juice from the mouth portions was observed.

With the heat set bottles molded from the solid-state polymerization chips other than Comparative Examples 13 and 14, no leakage or no deformation at the mouth portion, the shoulder portion and the barrel portion, was observed.

EXAMPLE 36

Using solid-state polymerization chips obtained in Example 13, a sheet having a thickness of 300 μm was molded by an extruder of 30 mm in diameter set for a temperature of various parts of the cylinder and various parts of the nozzle of 275° C., a screw rotational speed of 40 rpm and an extruding amount of 80 g/min. The extrusion molding was continued for 10 hours, whereby no substantial contamination of the cooling dram was observed. Further, this extruded sheet was simultaneously biaxially stretched at a stretching rate of 3×3 times by a Long biaxial stretching machine (manufactured by T. M. Long Co.) set for the internal temperature of 90° C. and then heat-set in an oven at 200° C. for 120 seconds under tension to obtain a stretched film having a thickness of 30 μm. The analytical results of the films are shown in Table 4.

EXAMPLE 37 to 40

Using solid-state polymerization chips obtained in Examples 13, 16, 18 and 22, sheets having a thickness of 300 μm were molded in the same manner as in Example 36 except that the temperature of various parts of the cylinder and various parts of the nozzle was set at 270° C. or 275° C. The extrusion molding was continued for 10 hours, whereby transparent sheets were molded satisfactorily in each case, and no substantial contamination of the cooling dram was observed. Further, using these extrusion molded sheets, biaxially stretched heat set films having a thickness of 30 μm were prepared in the same manner as in Example 36. The analytical results of the films are shown in Table 4.

COMPARATIVE EXAMPLES 31 and 32

Using solid-state polymerization chips obtained in Comparative Example 9, a sheet having a thickness of 300 μm was molded in the same manner as in Example 36 setting the temperature of various parts of the cylinder and various parts of the nozzle to a level of 270° C. or 275° C.

When the temperature of various parts of the cylinder and various parts of the nozzle was set at 275° C., a transparent sheet was obtained. However, when the extrusion molding was continued for 10 hours, deposition of a white thin film was observed on the cooling dram. Further, using this extruded sheet, a biaxially stretched heat set film having a thickness of 30 μm was prepared in the same manner as in Example 36. The analytical results of the film are shown in Table 4.

On the other hand, when the temperature of various parts of the cylinder and various parts of the nozzle was set at 270° C., a blushed sheet was obtained, and it was impossible to conduct the molding satisfactorily. The cause may be such that the solid-state polymerization chips had a high melting point, since no isophthalic acid component was copolymerized, and they could not completely be melted at the injection molding temperature of 270° C.

As shown in the foregoing Examples, the copolyester of the present invention has a low oligomer content and produces little oligomers as byproducts during the molding. Further, as compared with homopolymerized PET, it can be molded at a low temperature, whereby the possibility of producing oligomers as byproducts during the molding can further be minimized. Accordingly, when the copolyester of the present invention is molded, contamination of the mold scarcely occurs, and it is not necessary to frequently clean the molding apparatus for the production of molded products, whereby the productivity of the molded products such as bottles, films or sheets, can be improved. Besides, the copolyester of the present invention is excellent in the heat resistance and mechanical strength and thus is suitable as a molding material for containers for fruit juice beverages which require heat resistance.

Further, the copolyester of the present invention has a high oligomer-reducing rate during the solid-state polymerization step in the process for its preparation, whereby the desired oligomer content can be attained in a short period of time as compared with conventional homopolymerized PET. In addition, the rate of increase of the intrinsic viscosity is high, the desired intrinsic viscosity can be attained in an equal or shorter period of time as compared with conventional homopolymerized PET, and thus the productivity is very high.

Thus, the copolyester of the present invention has a significantly high industrial value.

TABLE 1

| | Composition | | | | | | | | | |
|---|---|---|---|---|---|---|---|---|---|---|
| | IPA amount (mol %) | DEG amount (mol %) | Intrinsic viscosity (dl/g) | TEV (eq/ton) | AV (eq/ton) | AV/TEV (eq. %) | Ge amount (wt. ppm) | Sb amount (wt. ppm) | P amount (wt. ppm) | CT amount (wt. %) |
| Example 1 | 3.0 | 2.0 | 0.56 | 124 | 24.3 | 19.6 | 41 | 0 | 22 | 0.92 |
| Example 2 | 2.0 | 2.0 | 0.56 | 124 | 23.8 | 19.2 | 43 | 0 | 23 | 0.94 |
| Example 3 | 1.5 | 1.7 | 0.57 | 121 | 20.2 | 16.7 | 53 | 0 | 27 | 0.96 |
| Example 4 | 1.0 | 2.2 | 0.58 | 118 | 16.1 | 13.6 | 48 | 0 | 30 | 0.97 |
| Example 5 | 2.0 | 2.0 | 0.56 | 124 | 24.0 | 19.4 | 0 | 240 | 76 | 0.93 |
| Example 6 | 2.0 | 2.0 | 0.55 | 128 | 18.2 | 14.2 | 0 | 213 | 43 | 0.93 |
| Example 7 | 2.0 | 2.0 | 0.56 | 124 | 12.8 | 10.3 | 0 | 238 | 75 | 0.93 |
| Example 8 | 2.0 | 2.0 | 0.58 | 118 | 26.5 | 22.5 | 0 | 240 | 75 | 0.93 |
| Example 9 | 1.5 | 1.7 | 0.55 | 128 | 27.5 | 21.5 | 0 | 191 | 37 | 0.95 |
| Example 10 | 1.0 | 2.3 | 0.56 | 124 | 21.1 | 17.0 | 0 | 230 | 51 | 0.95 |
| Comparative Example 1 | 0.0 | 2.0 | 0.56 | 124 | 24.1 | 19.4 | 43 | 0 | 24 | 1.01 |
| Comparative Example 2 | 0.0 | 2.0 | 0.56 | 124 | 23.7 | 19.1 | 0 | 242 | 75 | 1.00 |
| Comparative Example 3 | 6.0 | 2.4 | 0.58 | 118 | 24.0 | 20.3 | 43 | 0 | 24 | 0.88 |
| Comparative Example 4 | 2.0 | 4.0 | 0.58 | 118 | 23.3 | 19.7 | 43 | 0 | 23 | 0.88 |
| Comparative Example 5 | 2.0 | 2.0 | 0.56 | 124 | 32.9 | 26.5 | 44 | 0 | 23 | 0.94 |
| Comparative | 2.0 | 2.0 | 0.55 | 128 | 32.5 | 25.4 | 0 | 239 | 76 | 0.93 |

TABLE 1-continued

| | Composition | | Intrinsic viscosity (dl/g) | TEV (eq/ton) | AV (eq/ton) | AV/TEV (eq. %) | Ge amount (wt. ppm) | Sb amount (wt. ppm) | P amount (wt. ppm) | CT amount (wt. %) |
|---|---|---|---|---|---|---|---|---|---|---|
| | IPA amount (mol %) | DEG amount (mol %) | | | | | | | | |
| Example 6 | | | | | | | | | | |
| Comparative Example 7 | 2.0 | 2.0 | 0.56 | 124 | 23.3 | 18.8 | 25 | 0 | 20 | 0.94 |
| Comparative Example 8 | 2.0 | 2.0 | 0.56 | 124 | 23.6 | 19.0 | 0 | 120 | 28 | 0.93 |

TABLE 2

| | Solid-state polymerization condition | | | Composition | | Intrinsic viscosity (dl/g) | TEV (eq/ton) | AV (eq/ton) | AV/TEV (eq. %) |
|---|---|---|---|---|---|---|---|---|---|
| | Prepolymer used | Temp. (°C.) | Time (hr) | IPA amount (mol %) | DEG amount (mol %) | | | | |
| Example 11 | Ex. 1 | 208 | 20 | 3.0 | 2.0 | 0.80 | 73.8 | 13.2 | 17.9 |
| Example 12 | Ex. 1 | 215 | 20 | 3.0 | 2.0 | 0.87 | 65.3 | 10.3 | 15.8 |
| Example 13 | Ex. 2 | 208 | 20 | 2.0 | 2.0 | 0.80 | 73.8 | 12.6 | 17.1 |
| Example 14 | Ex. 2 | 215 | 20 | 2.0 | 2.0 | 0.87 | 65.3 | 9.7 | 14.9 |
| Example 15 | Ex. 3 | 208 | 20 | 1.5 | 1.7 | 0.79 | 75.2 | 11.2 | 14.9 |
| Example 16 | Ex. 4 | 208 | 20 | 1.0 | 2.2 | 0.74 | 82.7 | 7.4 | 8.9 |
| Example 17 | Ex. 5 | 208 | 20 | 2.0 | 2.0 | 0.78 | 76.6 | 13.0 | 17.0 |
| Example 18 | Ex. 5 | 215 | 20 | 2.0 | 2.0 | 0.83 | 69.9 | 10.2 | 14.6 |
| Example 19 | Ex. 6 | 208 | 20 | 2.0 | 2.0 | 0.74 | 82.7 | 8.3 | 10.0 |
| Example 20 | Ex. 7 | 208 | 20 | 2.0 | 2.0 | 0.70 | 91.6 | 6.6 | 7.2 |
| Example 21 | Ex. 8 | 208 | 20 | 2.0 | 2.0 | 0.85 | 67.5 | 16.8 | 24.9 |
| Example 22 | Ex. 9 | 208 | 20 | 1.5 | 1.7 | 0.77 | 78.0 | 13.9 | 17.8 |
| Example 23 | Ex. 10 | 208 | 20 | 1.0 | 2.3 | 0.76 | 79.5 | 9.6 | 12.1 |
| Comparative Example 9 | Comp. Ex 1 | 208 | 20 | 0.0 | 2.0 | 0.78 | 76.6 | 12.8 | 16.7 |
| Comparative Example 10 | Comp. Ex 1 | 208 | 30 | 0.0 | 2.0 | 0.85 | 67.5 | 10.0 | 14.8 |
| Comparative Example 11 | Comp. Ex 2 | 208 | 20 | 0.0 | 2.0 | 0.76 | 79.5 | 13.1 | 16.5 |
| Comparative Example 12 | Comp. Ex 2 | 208 | 30 | 0.0 | 2.0 | 0.83 | 69.9 | 11.1 | 15.9 |
| Comparative Example 13 | Comp. Ex 3 | 208 | 20 | 6.0 | 2.4 | 0.83 | 69.9 | 10.8 | 15.5 |
| Comparative Example 14 | Comp. Ex 4 | 208 | 20 | 2.0 | 4.0 | 0.83 | 69.9 | 11.1 | 15.9 |
| Comparative Example 15 | Comp. Ex 5 | 208 | 20 | 2.0 | 2.0 | 0.83 | 69.9 | 20.3 | 29.0 |
| Comparative Example 16 | Comp. Ex 6 | 208 | 20 | 2.0 | 2.0 | 0.83 | 69.9 | 19.9 | 28.4 |
| Comparative Example 17 | Comp. Ex 7 | 208 | 20 | 2.0 | 2.0 | 0.73 | 84.3 | 13.3 | 15.8 |
| Comparative Example 18 | Comp. Ex 8 | 208 | 20 | 2.0 | 2.0 | 0.68 | 93.6 | 10.5 | 11.2 |

| | Ge amount (wt. ppm) | Sb amount (wt. ppm) | P amount (wt. ppm) | CT amount (wt. %) | Density (g/cm³) | Tg (°C.) | AA amount (wt. ppm) | Solid-state polymerization rate (dl/g/hr) |
|---|---|---|---|---|---|---|---|---|
| Example 11 | 41 | 0 | 22 | 0.31 | 1.402 | 76.6 | 2.3 | 0.012 |
| Example 12 | 41 | 0 | 22 | 0.25 | 1.405 | 76.8 | 2.0 | 0.016 |
| Example 13 | 43 | 0 | 23 | 0.30 | 1.404 | 77.0 | 2.1 | 0.012 |
| Example 14 | 43 | 0 | 23 | 0.24 | 1.406 | 77.2 | 2.0 | 0.016 |
| Example 15 | 53 | 0 | 27 | 0.24 | 1.404 | 77.3 | 2.1 | 0.011 |
| Example 16 | 48 | 0 | 30 | 0.25 | 1.403 | 77.5 | 2.1 | 0.0080 |
| Example 17 | 0 | 240 | 76 | 0.28 | 1.404 | 77.1 | 2.1 | 0.011 |
| Example 18 | 0 | 240 | 76 | 0.23 | — | — | — | 0.014 |
| Example 19 | 0 | 213 | 43 | 0.23 | — | — | — | 0.0095 |
| Example 20 | 0 | 238 | 75 | 0.24 | — | — | — | 0.0070 |
| Example 21 | 0 | 240 | 75 | 0.36 | — | — | — | 0.014 |
| Example 22 | 0 | 191 | 37 | 0.34 | — | — | — | 0.011 |
| Example 23 | 0 | 230 | 51 | 0.25 | 1.403 | 77.4 | 2.2 | 0.010 |
| Comparative Example 9 | 43 | 0 | 24 | 0.44 | 1.403 | 77.7 | 2.1 | 0.011 |
| Comparative Example 10 | 43 | 0 | 24 | 0.33 | 1.405 | 77.9 | 2.0 | 0.0097 |
| Comparative Example 11 | 0 | 242 | 75 | 0.40 | — | — | 2.1 | 0.010 |
| Comparative Example 12 | 0 | 242 | 75 | 0.30 | — | — | 2.0 | 0.0090 |
| Comparative Example 13 | 43 | 0 | 24 | 0.27 | 1.400 | 72.5 | 2.2 | 0.013 |
| Comparative Example 14 | 43 | 0 | 23 | 0.39 | 1.397 | 72.3 | 2.8 | 0.013 |
| Comparative | 44 | 0 | 23 | 0.50 | — | — | — | 0.014 |

TABLE 2-continued

| | | | | | | | | |
|---|---|---|---|---|---|---|---|---|
| Example 15 | | | | | | | | |
| Comparative Example 16 | 0 | 239 | 76 | 0.57 | — | — | — | 0.014 |
| Comparative Example 17 | 25 | 0 | 20 | 0.60 | — | — | — | 0.0065 |
| Comparative Example 18 | 0 | 120 | 28 | 0.51 | — | — | — | 0.0060 |

TABLE 3

| | Solid-state polymerization polyester used | Preform molding Temp (°C.) | Preform molding Appearance of preform | Hollow molded bottles Intrinsic viscosity (dl/g) | Hollow molded bottles CT amount (wt. %) | Hollow molded bottles Tg (°C.) | Hollow molded bottles Tc (°C.) | Hollow molded bottles AA amount (wt. ppm) | Effects to prevent contamination of a mold | Hot filling test results |
|---|---|---|---|---|---|---|---|---|---|---|
| Example 24 | Example 11 | 270 | ○ | 0.77 | 0.34 | 76.6 | 158 | 9.8 | ○ | ○ |
| Example 25 | Example 13 | 275 | ○ | 0.77 | 0.34 | 77.0 | 156 | 10.8 | ○ | ○ |
| Example 26 | Example 14 | 265 | ○ | 0.85 | 0.26 | 77.3 | 159 | 8.9 | ○ | ○ |
| Example 27 | Example 15 | 275 | ○ | 0.75 | 0.29 | 77.0 | 156 | 11.4 | ○ | ○ |
| Example 28 | Example 16 | 275 | ○ | 0.70 | 0.30 | 77.4 | 155 | 11.5 | ○ | ○ |
| Example 29 | Example 17 | 275 | ○ | 0.75 | 0.32 | 77.1 | 135 | 11.2 | ○ | ○ |
| Example 30 | Example 18 | 265 | ○ | 0.81 | 0.25 | — | — | — | ○ | ○ |
| Example 31 | Example 19 | 275 | ○ | 0.71 | 0.27 | — | — | — | ○ | ○ |
| Example 32 | Example 20 | 275 | ○ | 0.65 | 0.30 | — | — | — | ○ | ○ |
| Example 33 | Example 21 | 275 | ○ | 0.75 | 0.41 | — | — | — | ○ | ○ |
| Example 34 | Example 22 | 275 | ○ | 0.74 | 0.38 | — | — | — | ○ | ○ |
| Example 35 | Example 23 | 275 | ○ | 0.73 | 0.29 | 77.5 | 132 | 11.0 | ○ | ○ |
| Comparative Example 19 | Comparative Example 9 | 275 | ○ | 0.74 | 0.56 | 77.8 | 155 | 12.0 | x | ○ |
| Comparative Example 20 | Comparative Example 10 | 275 | ○ | 0.81 | 0.46 | 77.9 | 157 | 11.7 | x | ○ |
| Comparative Example 21 | Comparative Example 10 | 270 | x (blushing) | — | — | — | — | — | — | — |
| Comparative Example 22 | Comparative Example 11 | 275 | ○ | 0.72 | 0.51 | — | — | 12.1 | x | ○ |
| Comparative Example 23 | Comparative Example 12 | 275 | ○ | 0.79 | 0.44 | — | — | 11.5 | x | ○ |
| Comparative Example 24 | Comparative Example 12 | 270 | x (blushing) | — | — | — | — | — | — | — |
| Comparative Example 25 | Comparative Example 13 | 275 | ○ | 0.79 | 0.36 | 72.4 | 183 | 11.0 | ○ | x |
| Comparative Example 26 | Comparative Example 14 | 275 | ○ | 0.78 | 0.47 | 72.4 | 181 | 11.5 | x | x |
| Comparative Example 27 | Comparative Example 15 | 275 | ○ | 0.78 | 0.62 | — | — | — | x | ○ |
| Comparative Example 28 | Comparative Example 16 | 275 | ○ | 0.79 | 0.65 | — | — | — | x | ○ |
| Comparative Example 29 | Comparative Example 17 | 275 | ○ | 0.70 | 0.70 | — | — | — | x | ○ |
| Comparative Example 30 | Comparative Example 18 | 275 | ○ | 0.65 | 0.59 | — | — | — | x | ○ |

Appearance of preform:
○: Good,
x: poor
Effects to prevent contamination of a mold:
○: Good,
x: poor
Hot filling test results:
○: Good,
x: poor

TABLE 4

| | Solid-state polymerization polyester used | Sheet molding Temp (°C.) | Sheet molding Appearance of sheet | Biaxially stretched sheet Intrinsic viscosity (dl/g) | Biaxially stretched sheet CT amount (wt. %) | Effects to prevent contamination of a mold |
|---|---|---|---|---|---|---|
| Example 36 | Example 13 | 275 | ○ | 0.76 | 0.35 | ○ |
| Example 37 | Example 13 | 270 | ○ | 0.77 | 0.33 | ○ |
| Example 38 | Example 16 | 275 | ○ | 0.69 | 0.31 | ○ |
| Example 39 | Example 18 | 275 | ○ | 0.74 | 0.26 | ○ |
| Example 40 | Example 22 | 275 | ○ | 0.73 | 0.30 | ○ |
| Comparative Example 31 | Comparative Example 9 | 275 | ○ | 0.73 | 0.58 | x |
| Comparative | Comparative | 270 | x | — | — | — |

TABLE 4-continued

|  | Solid-state polymerization polyester used | Sheet molding | | Biaxially stretched sheet | | Effects to prevent contamination of a mold |
|---|---|---|---|---|---|---|
|  |  | Temp (°C.) | Appearance of sheet | Intrinsic viscosity (dl/g) | CT amount (wt. %) |  |
| Example 32 | Example 9 | | (blushing) | | | |

Appearance of preform:
°: Good,
x: poor

Effects to prevent contamination of a mold:
°: Good,
x: poor

What is claimed is:

1. A copolyester which comprises, as main components, terephthalic acid as a dicarboxylic acid component and ethylene glycol as a diol component and which is characterized by:
   (1) isophthalic acid as a dicarboxylic acid component being from 0.5 to 3.0 mol %,
   (2) diethylene glycol as a diol component being from 1.0 to 2.5 mol %,
   (3) the intrinsic viscosity being from 0.60 to 1.50 dl/g,
   (4) the concentration of terminal carboxyl groups being at most 18 eq/ton, and
   (5) the content of a cyclic trimer being at most 0.40% by weight.

2. The copolyester according to claim 1, wherein the proportion of terminal carboxyl groups to the total terminal groups is from 7 to 25 equivalent %.

3. The copolyester according to claim 1, wherein the content of germanium atoms is from 30 to 60 ppm by weight.

4. The copolyester according to claim 1, wherein the content of antimony atoms is from 150 to 300 ppm by weight.

5. The copolyester according to claim 1, wherein the content of a cyclic trimer is at most 0.35% by weight.

6. A copolyester which is produced by solid-state polymerization of a prepolymer comprising, as main components, terephthalic acid as a dicarboxylic acid component and ethylene glycol as a diol component and characterized by:
   (1) isophthalic acid as a dicarboxylic acid component being from 0.5 to 3.0 mol %,
   (2) diethylene glycol as a diol component being from 1.0 to 2.5 mol %,
   (6) the intrinsic viscosity being from 0.50 to 0.70 dl/g, and
   (7) the concentration of terminal carboxyl groups being from 15 to 30 eq/ton, and which is characterized by
   (1) isophthalic acid as a dicarboxylic acid component being from 0.5 to 3.0 mol %,
   (2) diethylene glycol as a diol component being from 1.0 to 2.5 mol %,
   (3) the intrinsic viscosity being from 0.60 to 1.50 dl/g,
   (4) the concentration of terminal carboxyl groups being at most 18 eq/ton, and
   (5) the content of a cyclic trimer being at most 0.40% by weight.

7. The copolyester according to claim 6, which is produced by solid-state polymerization of the prepolymer wherein the proportion of terminal carboxyl groups to the total terminal groups is from 10 to 25 equivalent %.

8. The copolyester according to claim 6, which is produced by solid-state polymerization of the prepolymer wherein the content of germanium atoms is from 30 to 60 ppm by weight.

9. The copolyester according to claim 6, which is produced by solid-state polymerization of the prepolymer wherein the content of antimony atoms is from 150 to 300 ppm by weight.

10. The copolyester according to claim 6, which is obtained by conducting the solid-state polymerization at a temperature of from 190° to 230° C. under a pressure of from 1 kg/cm²G to 0.01 mmHg for from 1 to 50 hours.

11. The copolyester according to claim 6, which is obtained by solid-state polymerization of the prepolymer, which is conducted after adjusting the moisture content of the prepolymer to a level of from 0.01 to 1.0% by weight.

12. The copolyester according to claim 1, wherein the copolyester consists essentially of terephthalic acid and isophthalic acid as dicarboxylic acid component and ethylene glycol and diethylene glycol as diol component.

13. The copolyester according to claim 1, wherein the copolyester consists of terephthalic acid and isophthalic acid as dicarboxylic acid component and ethylene glycol and diethylene glycol as diol component.

* * * * *